Sept. 9, 1969 L. P. ERDMAN 3,465,607
BELT DRIVE APPARATUS FOR TRACTOR-MOUNTED IMPLEMENT
Filed Nov. 7, 1967 2 Sheets-Sheet 1

INVENTOR.
LEON P. ERDMAN
BY
John C. Thompson
ATTORNEY

Sept. 9, 1969        L. P. ERDMAN        3,465,607

BELT DRIVE APPARATUS FOR TRACTOR-MOUNTED IMPLEMENT

Filed Nov. 7, 1967        2 Sheets-Sheet 2

INVENTOR.
LEON P. ERDMAN
BY
ATTORNEY

United States Patent Office 3,465,607
Patented Sept. 9, 1969

3,465,607
BELT DRIVE APPARATUS FOR TRACTOR-MOUNTED IMPLEMENT
Leon Paul Erdman, Beaver Dam, Wis., assignor to Deere & Company, Moline, Ill., a corporation of Delaware
Filed Nov. 7, 1967, Ser. No. 681,168
Int. Cl. F16h 7/12
U.S. Cl. 74—227                                11 Claims

ABSTRACT OF THE DISCLOSURE

A drive belt assembly for a tractor-mounted implement, the assembly having an improved belt tensioning apparatus which includes means to indicate whether or not it is necessary to retension the belt.

Field of the invention

The present invention relates generally to agricultural implements, and more particularly to tractor-mounted mowers and the like in which the mower is belt driven from a tractor drive sheave.

Cross reference to related application

This application discloses a belt drive assembly for the tractor-mounted mower additionally disclosed on copending application Ser. No. 681,208 filed Nov. 7, 1967.

Description of the prior art

In prior art mower drives, such as for example the type shown in U.S. Patent No. 3,283,486 issued Nov. 8, 1966, to Marek, it has been customary to drive a mower mounted underneath a midportion of a tractor from a forward drive sheave rotatable about a fore-and-aft extending axis by means of an endless belt, the belt being disposed over a pair of idler sheaves rotatable about a transversely extending axis and about the driven sheave on the implement which rotates about a vertically extending axis. The idler sheaves, which are of the type known as mule sheaves, have been rotatably journaled on a pair of arms both of which are welded to a rock shaft. An adjusting arm is also welded to the rock shaft and adjusting means in the form of a bolt is secured to the arm, the other end of the bolt having a nut thereon which is engageable with a portion of the tractor frame. By adjusting the nut, the belt may be tensioned after the parts have been initially assembled. Also, after operation when the belt has elongated, it is again necessary to tension the belt, and this adjustment is also performed through the nut and bolt adjusting mechanism.

This design has not been entirely satisfactory because when the bolt is initially tensioned, it is somewhat difficult to apply the proper amount of tension to the belt. If the nut is tightened too much, too much tension will be applied to the belt causing it to stretch and wear rapidly. If too little tension is applied to the belt, it may not properly drive the mower, and also it may jump the sheave. In either case, the belt will not wear properly when improperly tensioned. Even when the belt has been tensioned properly, it soon elongates requiring additional tensioning.

Summary of the invention

It is an object of the present invention to provide a mower drive assembly which overcomes the disadvantages of the prior art.

More particularly it is an object of the present invention to provide a mower belt drive assembly in which the tension of the belt may be maintained properly over longer intervals of time than in the prior art.

It is a further object of the present invention to provide a belt tensioning device for a tractor-mounted mower in which indicating means are provided to indicate whether or not the belt is properly tensioned.

It is another object of this invention to provide a belt tensioning device which will maintain the tension in the belt drive for a tractor-mounted implement movable between transport and working positions, where the distance between the driven sheave in the implement and idler sheave assembly is less in the working position than in the transport position.

It is a still further object of the present invention to provide an idler assembly for a belt driven mower mounted on a tractor in which the assembly is of high durability.

These and other objects and advantages of this invention will be apparent to those skilled in the art after a consideration of the following detailed description, taken in conjunction with the accompanying drawings in which the preferred form of this invention is illustrated.

Description of the preferred embodiment

In the following description right-hand and left-hand reference is determined by standing to the rear of the tractor and facing the direction of travel.

Figure 1:
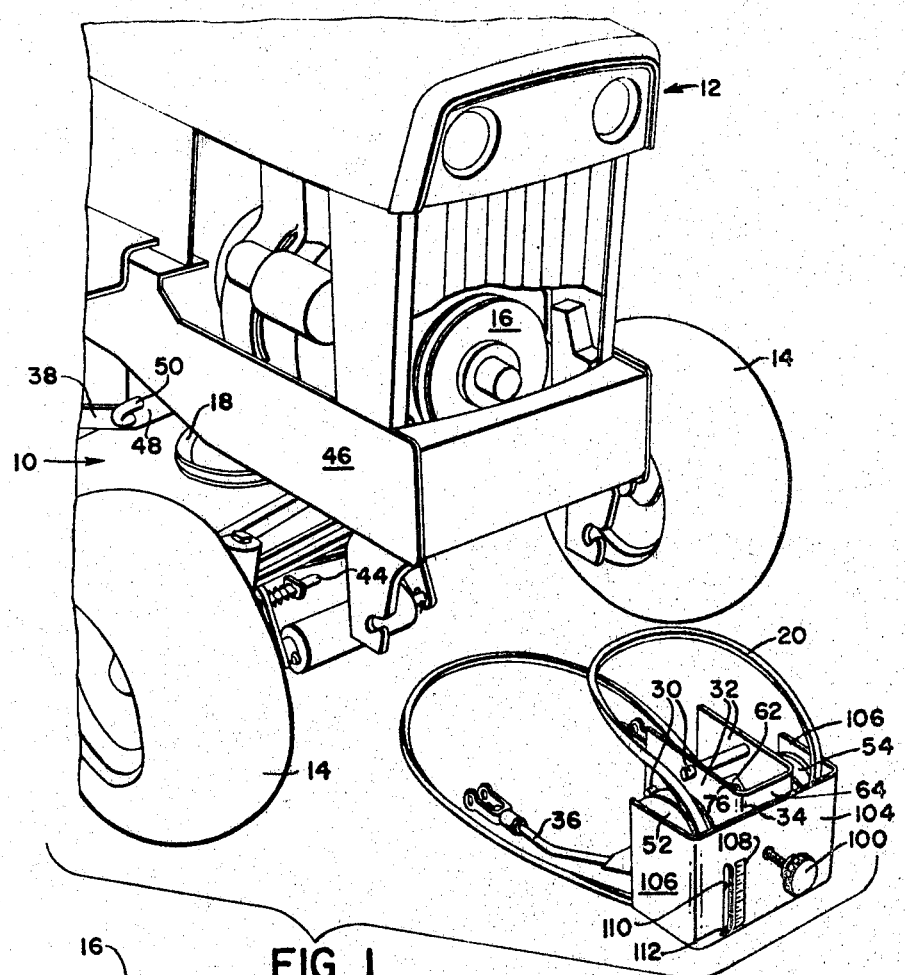
FIG. 1 is a perspective view of a forward portion of a tractor to which a mower has been secured for vertical movement, the improved idler assembly of this invention being shown removed from the tractor.

Referring first to FIG. 1, an implement indicated generally at 10, is shown mounted on a tractor, indicated generally at 12, between the front wheels 14 and the rear wheels (not shown). The tractor is provided with an engine having a forward drive sheave 16 which is rotatable about a generally fore-and-aft extending axis. A driven sheave 18 is mounted on the implement 10 and is adapted to be driven about a generally vertically extending axis. An endless belt 20 is adapted to be disposed over the drive sheave 16 and the driven sheave 18 as well as a pair of idler sheaves carried by an idler mounting assembly indicated generally at 22.

The idler assembly 22 is adapted to be secured to a pair of downwardly extending plate members 24 carried by the tractor 12 forward of the transversely extending axle 26. Each of the plates 24 is provided with a pair of forwardly and upwardly extending slots 28.

The idler assembly 22, includes a generally U-shaped support frame member 34, having spaced apart legs 32 which carry outwardly extending studs 30. The assembly 22 is mounted on the tractor 12 by disposing the studs 30 within the slots 28. The assembly 22 is held in place on the plate members 24 solely by gravity and the the tension of the endless belt 20, the tension being applied in a manner fully set forth below.

Figure 2:
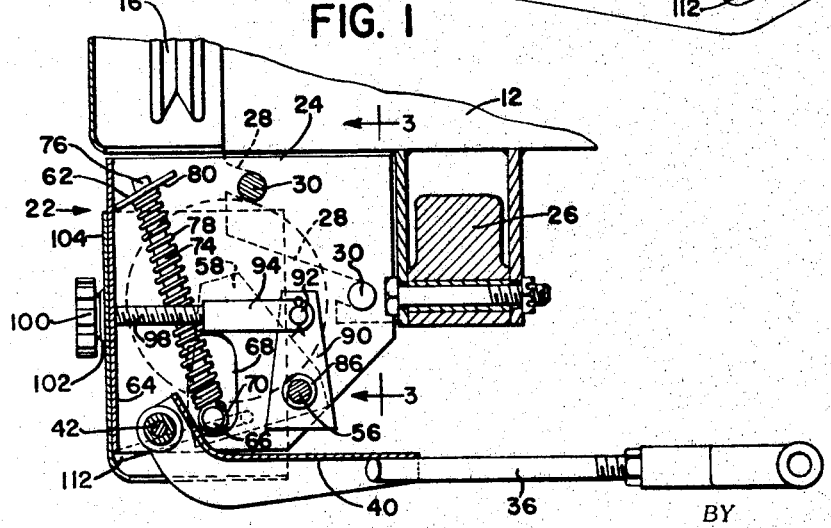
FIG. 2 is a sectional view of the belt idler assembly taken from the left when the idler assembly is mounted on the tractor.

The mower assembly 10 is supported for generally vertical swinging movement by front and rear draft links 36, 38, respectively. The forward end of the front draft links 36 are interconnected by a forward plate assembly indicated at 40, the forward plate assembly being journaled about a transversely extending pivot bolt 42 (FIG. 2). The rear ends of the draft links 36 are secured to the forward end of the mower 10 by means of Quick-Tatch spring biased J-shaped hooks 44. The forward ends of the rear draft links are secured to the side frame 46 by means of depending triangular plates 48 which also carry Quick-Tatch spring biased J-shaped attaching members 50.

The manner in which the mower is secured to the tractor is more fully disclosed in copending application Ser. No. 681,208 filed concurrently with this application. It should be noted, however, that the mower is mounted for generally vertical movement by the front and rear draft links and that the belt 20 will be maintained under tension as the mower is raised and lowered between its transport and working positions; however, there is a slight forward movement of the sheave 18 as the mower 10 is lowered.

Figure 3:
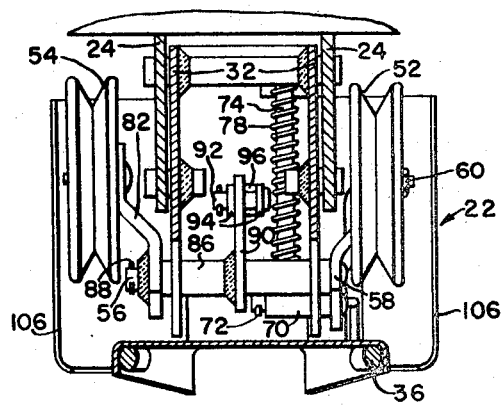
FIG. 3 is a view of the idler assembly taken along the lines 3—3 of FIG. 2.
Figure 4:
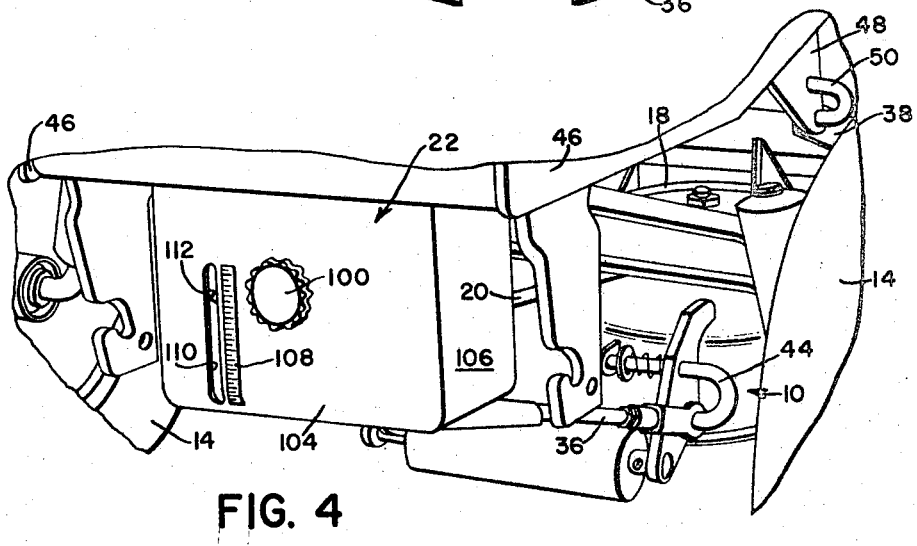
FIG. 4 is a perspective view of the idler assembly fully mounted on the tractor.

The ilder assembly 22 carries first and second idler sheaves 52, 54, respectively, which are rotatable about axes extending transversely to the fore-and-aft center line of the tractor 12. As can best be seen from FIGS. 1 and 3, the sheaves 52, 54 are supported outside of the spaced apart legs 32 of the generally U-shaped support frame member 34.

The first sheave 52 is supported for swinging movement between first and second positions by mounting means which includes a pivot shaft 56 and an arm 58, the arm being generally triangularly shaped (as can best be seen from FIG. 2) and having one apical portion welded to the pivot shaft 56. The sheave 52 is journaled for rotation to a transversely extending bearing assembly 60 secured at one end to another apical portion of the arm 58.

Spring means are provided for normally biasing the first idler sheave into one of its two positions but permitting movement towards the other position against the force of a spring. The spring means includes an apertured lug 62 which is welded to one of the legs 32 and the bight portion 64 of the U-shaped support frame member 34. A transversely projecting stud 66 is welded to the third apical portion of the arm 58 and projects inwardly through an aperture 68 in the right-hand leg 32. A sleeve member 70 is rotatably disposed about the stud 66 and is held from sliding off by a cotter pin 72. A rod 74 is welded to the sleeve and projects upwardly, the upper end 76 of the rod 74 projecting through the aperture in the apertured lug 62. A spring 78 is disposed about the rod 74 and bears against the lower surface 80 of the lug 62 and against the upper surface of the sleeve 70. When the parts are assembled, the spring is preloaded to bias the sheave 52 towards its forward position as can best be seen in FIG. 2.

The second idler sheave 54 is also mounted for its swinging movement between first and second positions about a generally transversely extending axis. The means mounting the second sheave for swinging movement includes an arm 82 (FIG. 3) which is welded as at 84 to a transversely extending pivot member, which is in the form of a sleeve 86. The sleeve 86 is journaled for rotation in aligned transversely extending apertures in the legs 32. As can be seen from FIGS. 2 and 3, the pivot shaft 56 to which the arm 58 is secured is rotatably disposed within the sleeve 86 and is held within the sleeve by means of a cotter pin 88 at one end thereof.

Screw threaded adjusting means are provided for adjustably positioning the idler shaft 54. The adjusting means includes an arm or bracket 90 welded to the pivot sleeve 86, one end of the arm 90 being apertured to receive a pivot member 92. A U-shaped member having spaced apart legs 94 and a bight portion 96 with a threaded aperture (no number) is disposed with the legs 94 rotatably journaled about the pivot member 92 to either side of the arm 90. A screw member in the form of a stud 98 having a knob 100 secured at one end is provided with the stud 98 being screwed into the threaded aperture of the bight portion 98. A washer 102 is disposed between the knob 100 and a shield 104 fixed to the exterior or forward side of the bight 64, the washer and shield cooperating to form an abutment surface which will cause the rearward movement of the second sheave 54 to be limited depending upon the particular position of the stud within the bight 96.

The shield 104 is provided with spaced apart legs 106 which are disposed outwardly of the sheaves 52, 54. Indicia means 108 are disposed on the forward surface of the shield 104 adjacent an elongated slot 110. Indicating means in the form of an indicator 112 is welded to the arm 58 and serves to indicate the tension within the endless belt 20 when the parts are assembled.

The idler assembly 22 of this invention serves to initially tension the belt 20 after the mower 10 has been mounted on the tractor 12, and then to maintain the proper tension in the belt for longer periods of time than is possible with present day tensioning devices. To this end it should be noted that after the mounting structure has been interconnected with the tractor by placing the studs 30 in slots 28, and after the mower has been secured to the mounting structure and tractor by draft links 36, 38, it is only necessary to place the belt 20 about the drive sheave 16, the driven sheave 18, and the idler sheaves 52, 54. After this has been done, the belt is slack, and the sheave 54 is in a rearward position. To tighten the belt, it is necessary to move sheave 54 forwardly to increase the overall belt travel length. In applicant's structure, this is accomplished by turning the adjusting knob 100 in a clockwise direction (when faced from the front) which in turn will draw the left-hand sheave 54 forwardly. As the sheave is moved forwardly, the tension in the belt will be increased until there is sufficient tension in the belt to start to swing the sheave 52 rearwardly against the preloading spring 78. The knob 100 is continued to be turned until the end of the indicator 112 reaches the upper end of the slot 110, this additional tightening being necessary to provide for elongation of the belt 20. It should be noted at this point that the geometry of the arm 58 is such that as the sheave 52 is swung rearwardly as the sheave 54 is advanced forwardly, the moment arm through which the spring 78 acts shortens as the force of the spring increases, this being so that substantially the same tension is maintained in the belt.

As the mower or implement 10 is moved from its raised position to its lowered position, the drive sheave 18 will move towards the forward end of the tractor. However, the spring mounted idler 52 will accommodate this forward movement as well as elongation within the belt.

As the belt elongates during operation, the idler sheave 52 will move forwardly due to the action of the spring 78. As the idler moves forwardly, the indicator 112 will move downwardly within the slot 110 and it will indicate when it is necessary to retension the belt 20.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

I claim:

1. A belt drive apparatus comprising: a plurality of sheaves, an endless belt disposed about said sheaves, said plurality of sheaves including a drive sheave, a driven sheave movable towards and away from said drive sheave, and first and second idler sheaves, spring means mounting said first idler sheave for movement between first and second positions, means mounting said second idler sheave for adjustable movement to preset the tension in the belt against the action of the spring biased first idler sheave whereby the tension of the belt may be initially varied from a slack position to a fully tensioned position, said mounting means also accommodating for elongation of the belt, and indicating means carried by the means mounting the first idler sheave and movable with said first idler sheave to indicate the tension and/or elongation of said belt.

2. In combination with a tractor having a drive sheave, a tractor-mounted implement having a driven sheave, and an endless belt disposed about said sheaves, an idler assembly comprising: first and second idler sheaves, a support frame securable to said tractor, first and second means mounting said first and second idler sheaves, respectively, on said support frame for swinging movement between first and second positions, spring means acting between the first mounting means and the support frame to bias said first idler sheave in one direction, adjustment means acting between the second mounting means and the support frame, said first idler sheave being movable against said spring means within a range to hold the endless belt properly tensioned under varying conditions after the tension has been initially preset, said second idler sheave being adjustable by said adjustment means to initially preset the tension in the belt against the action of the spring means whereby the tension in the belt may be initially varied from a slack position to a fully tensioned position, and being adjustable further to compensate for belt elongation, indicator means carried by said first mounting means, and indicia means on said support frame cooperable with said indicator means to designate belt tension and/or elongation.

3. The combination set forth in claim 2 in which said support frame comprises a generally U-shaped member having spaced apart legs, said first and second idler sheaves being disposed outwardly said legs, and said spring means and said adjustment means being disposed between said legs.

4. The combination set forth in claim 3 in which said support frame further comprises a shield member secured to the bight portion of said U-shaped member, said shield member having leg members disposed to the outer sides of said first and second idler sheaves, there being an elongated slot in the shield member through which the indicator means projects, said indicia means being on said shield adjacent said slot.

5. The combination set forth in claim 2 in which said spring means is preloaded.

6. The combination set fourth in claim 2 in which said first mounting means comprises a pivot shaft mounted on said support frame, and an arm, one portion of which is mounted on said pivot shaft, another portion of which carries the first idler sheave.

7. The combination set forth in claim 6 in which said spring means comprises an apertured lug fixed to said support frame, a stud carried by another portion of said arm, a sleeve rotatably disposed about said stud, a rod carried by said sleeve and extending through said aperture, and a spring disposed about said rod and engaging said lug.

8. The combination set forth in claim 7 in which the moment arm through which the spring acts is reduced as the spring force is increased whereby substantially the same tension is maintained in the belt.

9. The combination set forth in claim 2 in which said second mounting means comprises a pivot structure rotatably journaled within said support frame, and an arm, one end of which is rigidly secured to said pivot structure and the other end of which carries said second idler sheave.

10. The combination set forth in claim 9 in which said adjusting means comprises a bracket fixed to said pivot structure, a threaded aperture member carried by said bracket and a screw member engaged within said threaded aperture, said screw member passing through said support frame and having an abutment surface which engages said frame.

11. In combination with a tractor having a drive sheave rotatable about a fore-and-aft extending axis, a tractor-mounted implement having a driven sheave rotatable about a generally vertically extending axis, and an endless belt disposed about said sheaves; an idler assembly comprising: first and second idler sheaves rotatable about generally transversely extending axes, a support frame securable to said tractor, first means mounting said first idler sheave for swinging movement between first and second positions and including a pivot shaft and an arm, one portion of which is mounted on said pivot shaft, another portion of which carries the first idler sheave, second means mounting said second idler sheave for swinging movement and including a pivot sleeve rotatably journaled within said support frame, and an arm, one end of which is rigidly mounted on said pivot sleeve, the other end of which carries the second idler sheave, said pivot shaft being rotatably journaled within said pivot sleeve, spring means acting between the first mounting means and the support frame to bias said first idler sheave in one direction, adjustment means acting between the second mounting means and the support frame, said first idler sheave being movable against said spring means within a range to hold the endless belt properly tensioned under varying conditions after the tension has been initially preset, said second idler sheave being adjustable by said adjustment means to initially preset the tension in the belt against the action of the spring means whereby the tension in the belt may be initially varied from a slack position to a fully tensioned position, and being adjustable further to compensate for belt elongation, indicator means carried by said first mounting means, and indicia means on said support frame cooperable with said indicator means to designate belt elongation.

References Cited
UNITED STATES PATENTS 3,380,313   4/1968   Bulin _____ 74—277

FOREIGN PATENTS 1,243,575   9/1960   France.

FRED C. MATTERN, Primary Examiner

JAMES A. WONG, Assistant Examiner